Figure 1:
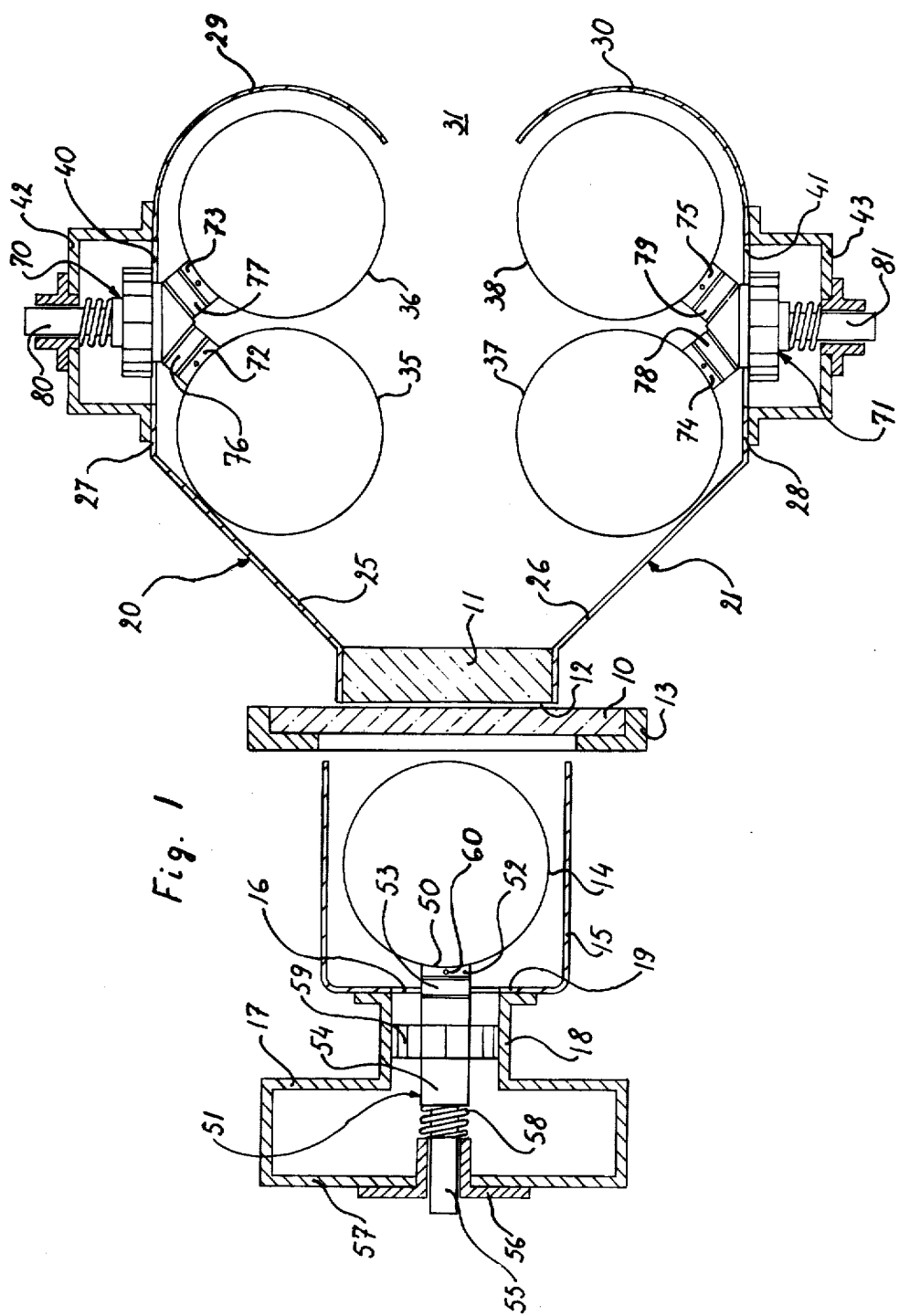

United States Patent [19]

van de Laarschot et al.

[11] 4,168,522

[45] Sep. 18, 1979

[54] LIGHT EMISSION CONTROL FOR GAS-DISCHARGE LAMP

[75] Inventors: Franciscus A. A. E. van de Laarschot, Geldrop; Guido J. M. van der Velden, Valkenswaard, both of Netherlands

[73] Assignee: Océ-van der Grinten N.V., Venlo, Netherlands

[21] Appl. No.: 807,252

[22] Filed: Jun. 16, 1977

[30] Foreign Application Priority Data

Jul. 12, 1976 [NL] Netherlands .................... 7607680

[51] Int. Cl.² ........................................... F21V 29/00
[52] U.S. Cl. .................................. 362/294; 362/373
[58] Field of Search .................... 362/294, 240, 373; 136/203

[56] References Cited

U.S. PATENT DOCUMENTS

| | | | |
|---|---|---|---|
| 3,064,440 | 11/1962 | Waller | 136/203 X |
| 3,361,903 | 1/1968 | Brown | 362/294 |
| 3,541,492 | 11/1970 | Fenn | 362/294 X |
| 3,733,461 | 5/1973 | Rohats | 362/294 X |
| 3,751,657 | 8/1973 | Sangiamo et al. | 362/294 |
| 3,779,640 | 12/1973 | Kidd | 362/294 X |
| 3,860,903 | 1/1975 | Van Steenhoven | 362/294 X |
| 3,862,397 | 1/1975 | Anderson et al. | 362/294 |
| 3,870,873 | 3/1975 | Mallory | 362/294 X |
| 3,936,686 | 2/1976 | Moore | 362/294 X |
| 3,959,644 | 5/1976 | Dammel et al. | 362/294 X |
| 4,100,593 | 7/1978 | Bond | 362/294 X |

*Primary Examiner*—Peter A. Nelson
*Attorney, Agent, or Firm*—Albert C. Johnston

[57] ABSTRACT

The light emission of a gas-discharge lamp is controlled effectively by the action of a cooling organ making use of a Peltier element having its cold side thermally connected with a portion of the wall of the lamp and having its hot side thermally connected with means for discharging heat to the ambient, together with means for sensing the temperature at said wall portion and for regulating correspondingly an electrical current to the Peltier element.

8 Claims, 2 Drawing Figures

LIGHT EMISSION CONTROL FOR GAS-DISCHARGE LAMP

This invention relates to a system or apparatus for controlling the light emission of a gas-discharge lamp, in which the cooling capacity of an organ for cooling a portion of the wall of the lamp is regulated in accordance with the temperature sensed at the lamp wall portion being cooled.

It is known that the light emission of a gas-discharge lamp depends on the vapor pressure in the lamp, which in turn is determined by the lowest temperature occurring in it, so that the light emission can be controlled by cooling more or less a portion of the wall of the lamp. See, for instance, Van der Grinten-Bulletin No. 21, pages 7-12 (1957), German Auslegeschrift No. 1,264,239, and U.S. Pat. Nos. 3,432,232 and 3,779,640.

The said German Auslegeschrift describes an apparatus for cooling a gas-discharge lamp whereby, in addition to an overall cooling of the lamp by a flow of cooling air, a portion of the wall of the lamp is cooled by an additional quantity of cooling air which is regulated according to the sensed temperature of this wall portion.

That known apparatus has a disadvantage in that the degree of cooling of the lamp wall portion depends substantially on the temperature of the cooling air, which temperature can vary within wide limits. This makes it necessary to control the quantity of cooling air, which cannot easily be effected in practice. Moreover, the efficiency of such a cooling is very low, because there is poor heat transmission between the wall portion concerned and the cooling air.

The principal object of the present invention is to provide an apparatus of the kind mentioned, by which the stated disadvantages of the known apparatus can be avoided.

This object is achieved according to the invention by the provision of a cooling organ which makes use of a Peltier element having its cold side thermally connected with a portion of the wall of the lamp having its hot side thermally connected with means for discharging heat to the ambient. In this way, a portion of the lamp wall can be cooled thoroughly and in a precisely controllable manner. Moreover, the size of the cooled lamp wall portion can be better defined, so that any disturbing drop of the lamp emission can be counteracted more effectively.

When the apparatus comprises a channel for supplying cooling air for an overall cooling of the lamp, the hot side of the Peltier element preferably is thermally connected with thermally conductive members located inside the air supply channel. Consequently, only one supply of cooling air is required, yet the hot side of the Peltier element is cooled efficiently with fresh cooling air.

In a preferred embodiment of the invention, the cold side of the Peltier element is thermally connected with the lamp wall portion to be cooled through a block of thermally conductive material, one side of which is formed with a shape complementary to the shape of that wall portion and is held in thermal contact with it. A thermally conductive paste may be applied between this formed side of the block and the lamp wall portion.

The above mentioned and other objects, features and advantages of the invention will be further evident from the following description and the accompanying drawings of illustrative embodiments of the invention.

Figure 2:
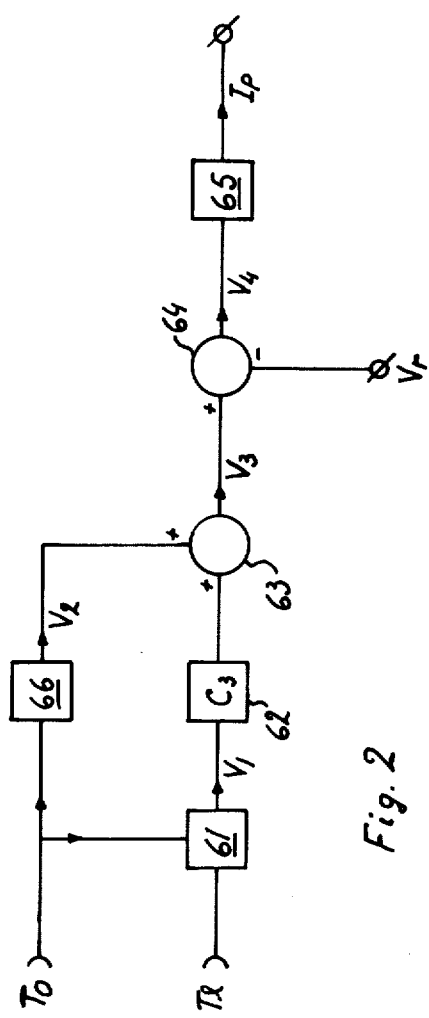

In the drawings:

FIG. 1 is a schematic cross-sectional view of an exposure apparatus equipped with gas-discharge lamps provided with cooling organs according to the invention; and FIG. 2 is a diagram of an electrical circuit for controlling the cooling capacity of the lamp cooling organs.

The apparatus shown in FIG. 1 includes two substantially rectangular glass plates 10 and 11 which together form an exposure slot 12 through which an original to be exposed can be transported in any desired way not further illustrated. The glass plate 10 is mounted in an apertured frame 13.

At the side of the glass plate 10 facing away from the exposure slot 12 a cylindrical gas-discharge lamp 14 is installed inside a reflecting housing 15 which is U-shaped in cross section. The lamp 14 and the housing 15 extend at least over the width of the exposure slot 12 (in the direction perpendicular to the plane of the drawing). A plurality of openings 16 are formed in the rear wall 19 of the housing 15 and regularly spaced apart in the direction perpendicular to the plane of FIG. 1. These openings are connected via a tubular passage, or connecting piece, 18 with a channel 17 which in turn is connected with a ventilator (not shown) for flowing cooling air over the lamp 14. The injected cooling air is discharged via the slotlike passages between the reflecting housing 15 and the frame 13. The channel 17, the reflector 15 and the frame 13 are fixed between frame plates (not shown) of the apparatus in which the exposure device is utilized.

The glass plate 11 is clamped between flanges at one extremity of two identical light reflecting housings 20 and 21 which are arranged mirror-symmetrically and are also fixed between the mentioned frame plates. Each of the reflecting housings 20 and 21 comprises a flat wall portion 25, respectively 26, which is inclined relative to the plane of the glass plate 11 and is joined with a flat wall portion 27, respectively 28, which lies in perpendicular relation to the plane of the glass plate 11 and extends to a joined, substantially semi-cylindrical wall portion 29, respectively 30, at the outer end of the reflecting housing.

A pair of cylindrical gas-discharge lamps 35 and 36, respectively 37 and 38, is mounted inside each of the reflecting housings 20 and 21. The respective wall portions 27 and 28 of these housings each have a plurality of openings 40 and 41, respectively, formed in them and regularly spaced apart in the direction perpendicular to the plane of FIG. 1. These sets of openings are connected respectively with channels 42 and 43 which are fixed against the outer sides of the wall portions 27 and 28, respectively, and in turn are each connected with a ventilator (not shown). The lamps 35-38 are thus cooled by streams of cooling air which are supplied via the ventilators, the channels 42 and 43 and the respective openings 40 and 41. This cooling air is discharged via the slotlike space at 31 between the curved housing wall portions 29 and 30.

In order to control optimally the light emission of the lamp 14, a portion 50 of the wall of this lamp is cooled additionally by a cooling organ 51 of which a principal element, according to the invention, is constituted by a Peltier element 53. The wall portion 50 constitutes only a very small, minor portion of the surface area of the lamp wall.

In the illustrated embodiment the cooling organ 51 comprises a block 52 of thermally conductive material, such as copper or aluminum, one side of which is shaped with a curvature complementary to the shape of the wall portion 50. The opposite side of the block 52 is thermally coupled to the cold side of the Peltier element 53 by a soldered connection, and the hot side of the Peltier element is in turn thermally coupled by a soldered connection to one extremity of a bar 54 of thermally conductive material such as copper or aluminum. The bar 54 extends at its other extremity from a shoulder into an end portion 55 of smaller diameter, which is supported slidingly in a bushing 56 mounted in an opening in the back wall 53 of the channel 17.

The cooling organ 51 thus constituted extends into the reflecting housing 15 through one of the openings 16 and is positioned so that the curved side of the block 52 is pressed against the wall portion 50 of the lamp 14 by the action of a spiral spring 58 which is compressed between the shoulder of the bar 54 and the inner end of the bushing 56. A thermally conductive paste, for instance a Schaffner product available commercially under the name "Heat transfer compound", is preferably applied between the shaped side of the block 52 and the wall portion 50. Further, a cooling element 59 of star-like configuration extends about the bar 54 between it and the wall of the tubular passage 18.

By virtue of the action of the Peltier element 53, the bar 54 and the related cooling star 59 acquire a higher temperature than the cooled wall portion 50 of the lamp. It thus becomes possible to cool the lamp effectively with relatively warm cooling air, as a great temperature difference exists between the bar 54 with cooling star 59 and the cooling air. Further, the temperature of the lamp wall portion 50 can be kept lower than the temperature of other wall portions of the lamp 14 by the conduction of heat from the block 52, the temperature of which nearly corresponds to that of the wall portion 50, via the Peltier element 53 to the bar 54 and then to freshly supplied cooling air in the passage 18. The quantity of heat so removed and thus also the temperature of the wall portion 50 can be controlled by regulation of the current flow through the Peltier element. In this way, effective cooling can be achieved with normal ambient air. Moreover, variations in the temperature of the ambient air can be compensated by controlling the transport of heat through the Peltier element.

In order to keep the temperature of the wall portion 50 substantially constant, the electrical current through the Peltier element 53, and consequently the temperature of the wall portion 50, are regulated by a control circuit, such as the circuit illustrated schematically in FIG. 2, in response to inputs from, respectively, a means for sensing the lamp temperature (Tl) at wall portion 50 and a means for sensing the temperature (To) of the ambient air. The lamp temperature sensor may be a thermocouple mounted in the block 52, as by being fixed in a hole 60 drilled in this block. This thermocopule for measuring the lamp temperature Tl is connected in series with a thermocouple which senses the ambient temperature To at any suitable location. The thermocouple outputs are combined in a device 61 which generates a voltage V1 corresponding to the difference between the temperatures Tl and To. The output of the To thermocouple is also applied to an absolute temperature meter 66, for instance of the type known as National LX 5600, which produces a voltage V2 corresponding to the temperature To and having a value represented by $V2=C2To$.

The voltage V1 is amplified by an amplifier 62 to a voltage C3V1, after which the voltages V2 and C3V1 are combined in the element 63, for instance an operational amplifier, which produces a voltage V3. The voltage V3 is then diminished in an element 64 by a reference voltage Vr, resulting in a voltage V4 which is supplied to a voltage-dependent current source 65 that emits a current Ip to flow through the Peltier element. Considering that $V1=C1\times(Tl-To)$, that $V2=C2To$, and that $V3=C2T1$ when $C2=C1\times C3$, it results that the input voltage V4 of the current source 65 is proportional to the absolute temperature Tl of the lamp; so the current passed through the Peltier element, and consequently also the temperature of the wall portion 50, can be controlled in correspondence with the temperature sensed at that wall portion of the lamp.

The pairs of lamps 35, 36 and 37, 38 located beyond the exposure slot 12, as shown in FIG. 1, are provided with cooling organs 70 and 71, respectively, which correspond generally to the cooling organ 51 described above but differ from the latter in that, in the embodiment shown, each of the organs 70 and 71 is adapted to cool portions of the walls of the two lamps of a pair. Thermally conductive copper blocks 72, 73, 74 and 75, respectively, have curved faces fitting and held against respective portions of the walls of the lamps 35, 36, 37 and 38. These blocks are thermally coupled via soldered connections to the cold sides of Peltier elements 76, 77, 78 and 79, respectively. The hot sides of the Peltier elements 76 and 77 are thermally coupled via soldered connections to a common copper bar 80, which for that purpose is provided at one extremity with two end faces disposed on an angle. The Peltier elements 78 and 79 are thermally coupled in the same way to a similar common copper bar 81. The further construction and arrangement of each of the cooling organs 70 and 71 and the manner of controlling their action are substantially the same as described above in regard to cooling organ 51.

It will be evident that the invention is not restricted to the embodiments described above and illustrated in the drawings and that numerous variations are possible within the principles of the invention. For instance, the cooling of the hot side of the Peltier element can be effected in other ways, such as by coupling the hot side thermally to the metal frame of the apparatus, by water-cooling it or by connecting it with the ambient via heat pipes. Where two lamps are arranged side by side it may be sufficient, if so desired, to have only one Peltier element for two lamps, in which case also only one thermocouple is required.

What is claimed is:

1. In apparatus for controlling the light emission of a gas-discharge lamp, lamp cooling means including an organ for cooling a portion of the wall of the lamp and thereby regulating the vapor pressure in the lamp, said wall portion constituting only a minor portion of the surface area of said wall, means for sensing the temperature of said wall portion and means for controlling correspondingly the cooling capacity of the cooling organ, the improvement wherein said cooling organ comprises a Peltier element the cold side of which is thermally connected with said portion of said wall and the hot side of which is thermally connected with means for discharging heat to the ambient.

2. Apparatus according to claim 1, said cooling means further including a channel for conducting a supply of cooling air to pass over said lamp, said heat discharging means comprising thermally conductive members located inside said channel and thermally connected with the hot side of said Peltier element.

3. Apparatus according to claim 2, said thermally conductive members including a bar of heat-conductive metal having an end face soldered to said hot side.

4. Apparatus according to claim 3, said cold side of said Peltier element being thermally connected with said wall portion through a block of thermally conductive material having a shaped side which is complementary to the shape of and is held in thermal contact with said wall portion, and means engaging said bar for pressing it with said Peltier element and said block as a unit toward said lamp so as to hold said opposite side of said block in thermal contact with said wall portion.

5. Apparatus according to claim 1, said cold side of said Peltier element being thermally connected with said wall portion through a block of thermally conductive material having a shaped side which is complementary to the shape of and is held in thermal contact with said wall portion.

6. Apparatus according to claim 5, said shaped side of said block engaging said wall portion through a thermally conductive paste applied between them.

7. Apparatus according to claim 5, the opposite side of said block being soldered to the cold side of said Peltier element.

8. Apparatus according to claim 1, said controlling means including a control circuit responsive to the temperature sensed at said wall portion for regulating correspondingly an electrical current through said Peltier element.

* * * * *